US008582872B1

(12) United States Patent
Ioffe et al.

(10) Patent No.: US 8,582,872 B1
(45) Date of Patent: Nov. 12, 2013

(54) PLACE HOLDER IMAGE DETECTION VIA IMAGE CLUSTERING

(75) Inventors: Sergey Ioffe, Mountain View, CA (US); Samy Bengio, Mountain View, CA (US); Troy Chinen, Fremont, CA (US); Olivier Bousquet, Ebmatingen (CH)

(73) Assignee: Google Inc., Mountain View, CA (US)

( * ) Notice: Subject to any disclaimer, the term of this patent is extended or adjusted under 35 U.S.C. 154(b) by 240 days.

(21) Appl. No.: 13/173,898

(22) Filed: Jun. 30, 2011

(51) Int. Cl.
*G06K 9/62* (2006.01)

(52) U.S. Cl.
USPC .......................................... 382/159; 382/224

(58) Field of Classification Search
None
See application file for complete search history.

(56) References Cited

U.S. PATENT DOCUMENTS

| | | | |
|---|---|---|---|
| 6,658,423 B1* | 12/2003 | Pugh et al. ............................ | 1/1 |
| 6,836,801 B1* | 12/2004 | Parrish et al. ................... | 709/224 |
| 2007/0078846 A1* | 4/2007 | Gulli et al. ........................ | 707/5 |
| 2008/0306913 A1* | 12/2008 | Newman et al. ................... | 707/3 |
| 2009/0070346 A1* | 3/2009 | Savona et al. ................... | 707/100 |
| 2009/0106226 A1* | 4/2009 | Ojakaar et al. ..................... | 707/5 |
| 2009/0208097 A1* | 8/2009 | Husseini et al. .............. | 382/162 |
| 2010/0030798 A1* | 2/2010 | Kumar et al. ................... | 707/102 |
| 2010/0150453 A1* | 6/2010 | Ravid et al. ..................... | 382/218 |
| 2010/0166321 A1* | 7/2010 | Sawant et al. ................. | 382/209 |
| 2010/0316290 A1* | 12/2010 | Jia ................................. | 382/165 |
| 2011/0029491 A1* | 2/2011 | Joshi et al. .................... | 707/692 |
| 2011/0087668 A1* | 4/2011 | Thomas et al. ................ | 707/738 |
| 2011/0219012 A1* | 9/2011 | Yih et al. ....................... | 707/749 |
| 2011/0280474 A1* | 11/2011 | Kaushal et al. ............... | 382/159 |

OTHER PUBLICATIONS

Yang, H. and Callan, J., Near-Duplicate Detection by Instance-level Constrianed Clustering, 2006, SIGIR '06, pp. 421-428.*
Wu, X., Ngo, C., Hauptmann, A.G., and Tan, H. Real-Time Near-Duplicate Elimination for Web Video Search with Content and Context, 2009, IEEE Transactions on Multimedia, vol. 11, No. 2, pp. 196-207.*
Jain, N., Dahlin, M., and Tewari, R., Using Bloom Filters to Refine Web Search Results, 2005, In Proc. 7th WebDB, pp. 25-30.*
Jaimes, A., Chang, S., and Loui, A.C., Duplicate Detection in Consumer Photography and News Video, 2002, In Proc. MM Int. Conf. on Multimedia, pp. 423-424.*
Foo, J.J., Zobel, J., and Sinha, R., Clustering Near-Duplicate Images in Large Collections, 2007, MIR '07, pp. 21-30.*
Agnew, B., Faloutsos, C., Wang, Z., and Welch, D., Multi-media Indexing Over the Web, 1997, SPIE, VOl. 3022, pp. 72-83.*
Chen et al., "Comparison of Near-Duplicate Image Matching," $3^{rd}$ European Conference on Visual Media Production, CMVP 2006, 5 pages.
Wang et al., "Filtering Image Spam with Near-Duplicate Detection," In Proc. of the Fourth Conference on Email Antispam EAS 2007, 10 pages.

* cited by examiner

*Primary Examiner* — Stephen R Koziol
*Assistant Examiner* — Jonathan S Lee
(74) *Attorney, Agent, or Firm* — Sterne, Kessler, Goldstein & Fox P.L.L.C.

(57) ABSTRACT

Methods, systems, and articles of manufacture for detecting placeholder images are disclosed. These include, accessing a collection of digital images, clustering the digital images to generate at least one of a plurality of exact-duplicate image clusters and a plurality of near-duplicate image clusters, and selecting one or more placeholder image clusters from at least one of the plurality of exact-duplicate image clusters or the plurality of near-duplicate image clusters.

21 Claims, 7 Drawing Sheets

PLACE HOLDER IMAGE DETECTION VIA IMAGE CLUSTERING

BACKGROUND

1. Field

This disclosure relates generally to detection of placeholder images.

2. Background

It is often the case that a website displays one or more images that clearly do not correspond to the context of the currently displayed webpage. Websites may have generic images that are displayed in lieu of the actual image corresponding to the particular context of the webpage. For example, in a listing of people, a generic image with the label "Image Not Available" may be displayed as the corresponding image next to the names of one or more people. In another example, a shopping web site may display generic images with labels such as "No Image Available," "coming soon," "under construction," "placeholder," "photo coming soon," or other label indicating that the displayed image is not the actual image corresponding to the particular context of the webpage.

The generic images that are used in place of actual images that are unavailable are referred to as "placeholder images." A placeholder image can be any image that is used in place of the actual image for any reason, such as when the latter image is unavailable. Placeholder images are found in many forms.

Although helpful in communicating to the user that the actual corresponding image is unavailable, placeholder images can diminish the user experience by reducing the quality of the presented results. For example, a user may be presented with the results of a product search where a majority of the products are displayed as placeholder images instead of actual images of the respective products.

Placeholder images can also reduce the accuracy of image search results. For example, depending on how the search query is structured, or based on how the system proceeds to search and categorize results, placeholder images may skew the search results by appearing in one or more of the resulting image sets.

Tools to efficiently identify placeholder images can be used to improve the user-experience, and also to improve the accuracy of the search results. For example, by detecting the presence of a substantial number of placeholder images in a webpage to be presented to a user, a webpage rendering program can reformat the webpage so that the products that have available corresponding images are displayed first or more prominently than the products that have only placeholder images. Likewise, placeholder images can be detected and removed from the result set before a user is presented with the results of a search.

Due to the large number of websites that are accessible, there may be numerous forms of placeholder images. It may be desired that a method to detect placeholder images should be capable of identifying placeholder images that appear in any websites that are accessible over the Internet.

The manual identification of placeholder images becomes highly inefficient when the image corpora from which to detect the placeholder images is large. Other methods, such as the use of optical character recognition (OCR) to determine whether images include words such as "Image Not Available," may be available. However, such approaches based on OCR may not be sufficiently accurate because of the numerous variations of the words, different languages, and also because many placeholders do not include any characters. Other approaches to identify placeholder images include using a detector trained on a large number of such images, and building a placeholder image model for each type of image (and possibly, one per merchant). However, conventional techniques such as those described above are not sufficiently scalable to detect placeholder images that may appear in the numerous websites that are accessible over the Internet.

BRIEF SUMMARY

Methods, systems, and articles of manufacture for detecting placeholder images are disclosed. According to an embodiment, a method of detecting placeholder images includes, accessing a collection of digital images, clustering the digital images to generate at least one of a plurality of exact-duplicate image clusters or a plurality of near-duplicate image clusters, and selecting one or more placeholder image clusters from at least one of the plurality of exact-duplicate image clusters or the plurality of near-duplicate image clusters.

Another embodiment is a system for detecting placeholder images including at least one processor, at least one memory coupled to the processor, a collection of digital images configured to be accessible by a program implemented on the processor, and a placeholder image detection module configured to be implemented on the processor. The placeholder image detection module includes an exact-duplicate clustering module configured to cluster images from the collection of digital images into exact-duplicate image clusters, a near-duplicate image clustering module configured to cluster images from the collection of digital images into near-duplicate image clusters, and a placeholder image cluster selection module configured to select one or more placeholder image clusters from at least one of the exact-duplicate image clusters or the near-duplicate image clusters.

Another embodiment is an article of manufacture including a non-transitory computer readable medium encoding instructions thereon that in response to execution by a computing device cause the computing device to perform operations including accessing a collection of digital images, clustering the digital images to generate at least one of a plurality of exact-duplicate image clusters or a plurality of near-duplicate image clusters, and selecting one or more placeholder image clusters from the at least one of the plurality of exact-duplicate image clusters or the plurality of near-duplicate image clusters.

Further features and advantages, as well as the structure and operation of various embodiments, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

Reference will be made to certain embodiments of the invention, examples of which may be illustrated in the accompanying figures. These figures are intended to be illustrative, not limiting. Although the present disclosure is generally described in the context of these embodiments, it should be understood that these embodiments are not limiting as to scope.

DETAILED DESCRIPTION

While the disclosure refers to illustrative embodiments for particular applications, it should be understood that the disclosure is not limited thereto. Those skilled in the art with access to the teachings herein will recognize additional modifications, applications, and embodiments within the scope thereof and additional fields in which the disclosure would be of significant utility.

Embodiments disclosed in the specification are directed to the detection of placeholder images using collections of digital images. A placeholder image, as described above, is an image that is displayed on a website (such as, for example, shopping sites) when the actual image is unavailable. Placeholder images diminish the visual quality of the presented results, and make it harder to use the visual characteristics of the respective images in ranking and search. Embodiments described herein can be used to detect placeholder images based upon images that are displayed in numerous websites accessible over the Internet.

Placeholder images are often found in large numbers relative to other images. This is particularly the case in the context of large image corpora accessible on the Internet. In many cases, the placeholder images were identical or were substantially identical from merchant to merchant and across various websites. Embodiments disclosed herein are directed to identifying such placeholder images by finding relatively large clusters of duplicate or near-duplicate images.

System for Detecting Placeholder Images

Figure 1A:
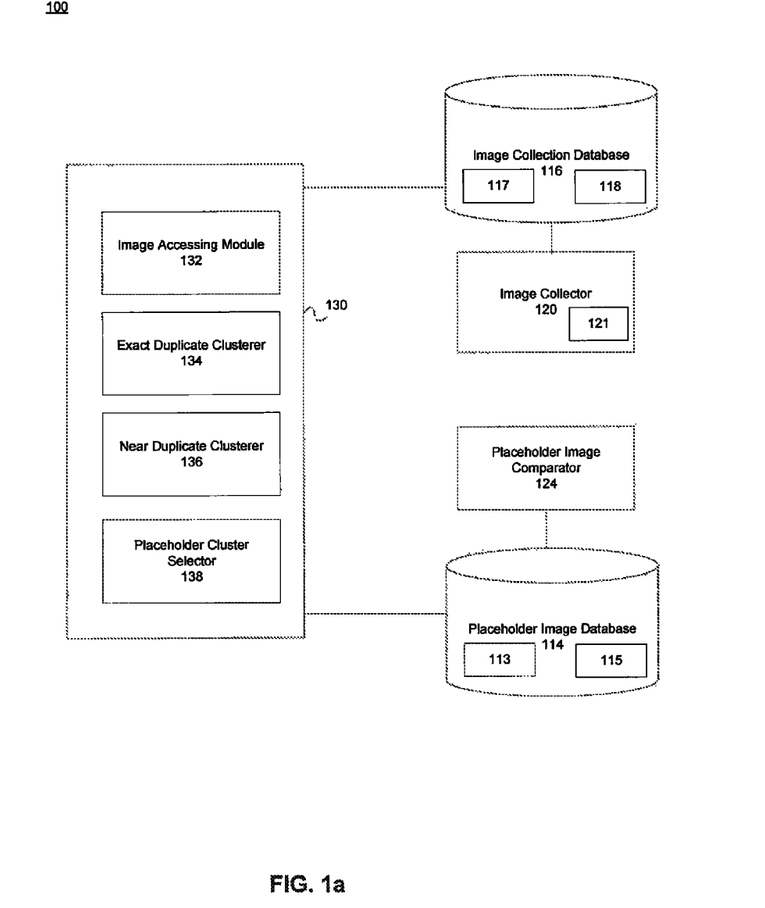
FIG. 1a illustrates a system to detect placeholder images in accordance with an embodiment.

FIG. 1*a* illustrates a system 100 to detect placeholder images, according to an embodiment. System 100 is configured to detect placeholder images using large image corpora, and optionally to build a database of placeholder images. The database of placeholder images can be used subsequently to identify other placeholder images. Other embodiments can be, for example, configured to establish a placeholder image identification service using the placeholder image database constructed from the large image corpora.

Placeholder image database 114 comprises a collection of identified (or otherwise known) placeholder images 113 and associated metadata 115. As used in this document, the term "database" implies any collection of data and methods to access the collection of data, and does not necessarily imply a commercially available database management system (DBMS). According to an embodiment, placeholder image database 114 includes one or more of a known placeholder image collection 113, and an associated metadata collection 115. The placeholder image database 114 may be local to other components of system 100 or may be remotely located. Placeholder images 113 represent images that have been selected as placeholder images. Metadata 115 includes information associated with respective images in placeholder images 113. Methods of maintaining images and metadata in database 114 may be similar to those corresponding methods described below with respect to image collection database 116.

The image collection databases 116 can be of any size. Embodiments may be particularly advantageous, relative to conventional methods, where the image collections are very large. Image collection database 116 can comprise a single database directly connected to a computer implementing system 100 or may be a distributed database communicatively coupled to such a computer. In an embodiment, image collection database 116 resides in a memory or persistent storage of a computer implementing system 100. In another embodiment, image collection database 116 can reside internally to a computer implementing system 100 as well as in remote computers.

According to an embodiment, image collection database 116 comprises images acquired from websites and associated information. For example, raw image data 117 may refer to images that were acquired from various websites. The actual images corresponding to raw image data 117 may not need to be stored locally in a computer implementing system 100. According to an embodiment, the actual images themselves can remain in their original locations. For images that remain stored in remote locations, sufficient information for the clustering and comparison operations (such as a feature vector, wavelet fingerprint, or hash signature) and a pointer to the original location may be stored locally in a computer implementing system 100. According to another embodiment, some or all images that are used in the placeholder detection system may be stored locally in a computer implementing system 100, or in a locally accessible server.

According to an embodiment, the image collection database 116 also includes metadata 118 about the images 117 that are available. The metadata associated with the images may be, for example, information that helps to distinguish placeholder images from other types of images. According to an embodiment, metadata associated with respective images include a "click-through rate" which is a quantifiable measure of how often a user clicked (or selected) the image upon it being displayed. According to another embodiment, the metadata can include a "linked sources count" which is a count of how many sources from which the image was linked to or otherwise made accessible. Metadata associated with the images 117 may be obtained from the same or different sources from which the corresponding images are obtained.

Image collector 120 includes functionality to acquire images that, for example, may be stored in image collection database 116. For example, in an embodiment, image collector 120 can automatically and periodically access websites to collect images and associated information. According to another embodiment, the image data collection by image collector 120 can be directed by an operator. Image collector 120 can receive images and associated data in response to its queries, which it then can store in image collection database 116. According to another embodiment, image collector 120 can acquire images and associated data, or part of that data, from a source that tracks user visits to various websites. In various embodiments, image collector 120 can also acquire manually input images along with associated metadata. Other means of acquiring images, such as by directly acquiring images by web crawling or incorporating collections of images that are already processed are possible and are contemplated within the scope of embodiments.

A metadata collector 121 can be associated with the image collector 120. Metadata collector 121 may include logic to acquire metadata, such as the click-through rates or linked sources information associated with each of the images acquired by image collector 120. According to an embodiment, metadata collector 121 can, for each image acquired by the image collector, query a service (not shown) to determine the available metadata for that image.

Placeholder image comparator 124 includes logic to compare a newly submitted image against the images in the placeholder image database 114 and determine if the newly submitted image is a placeholder image. According to an embodiment, placeholder image comparator 124 can compare the newly submitted image to each of the clusters identified as placeholder image clusters and stored in placeholder image database 114.

Placeholder image detector 130 includes logic to detect placeholder images in image collections, according to an embodiment. Placeholder image detector 130 includes an image accessing module 132, exact-duplicate clusterer 134, near-duplicate clusterer 136, and a placeholder image cluster selector 138.

Image accessing module 132 includes logic to access the images and image metadata, for example, to access images and associated metadata stored in image collection database 114.

Exact-duplicate clusterer 134 includes logic to perform grouping of identical images. According to an embodiment, exact-duplicate clusterer 134 computes a hash signature based on MD5 for each image. The hash signature of various images can be calculated and the images can be grouped into clusters, where each cluster includes only exactly matched images.

Near-duplicate clusterer 136 includes logic to perform clustering of images such that images that are nearly the same (i.e. nearly identical) are grouped into the same cluster. Near-duplicate image clusterer 136 would put in the same cluster, a first image and any other images that are close variations of the first image based on, for example, change of size, or change of color. Near-duplicate image clusterer 136 may include logic to implement one, or more than one, clustering operation on the input images. Near-duplicates can be identified by a method such as locality sensitive hashing, wavelet-based fingerprints, or local feature matching. According to an embodiment, using wavelet-based fingerprints, near-duplicates may be identified by computing a wavelet transform of each image according to conventional methods, and then comparing the most significant wavelet coefficients. The one or more clustering operations may, for example, include conventional techniques such as leader clustering, connected component analysis, agglomerative clustering and the like. In some embodiments, two or more stages of clustering can be performed, each stage using a different clustering method, so that each subsequent stage more finely groups clusters of the previous stage.

Placeholder cluster selector 138 includes logic to select one or more placeholder image clusters. According to an embodiment, placeholder cluster selector 138 makes its selection from among the clusters of exact-duplicates and the near-duplicates clusters. Placeholder cluster selector 138 can be configured to perform the selection of the clusters using one or more predetermined criteria. Example predetermined cluster selection criteria include a threshold relative size of clusters, a threshold internal similarity of images in the cluster, appearance of text in images of the clusters, and the like. Other selection criteria can include threshold click-through rates, and threshold number of sources linking to the images in the cluster.

System 100 can be implemented in software, hardware, or a combination thereof. According to an embodiment, system 100 can be implemented in a server or other network-connected computer, a server farm, a cloud computing platform, or the like.

Figure 1B:
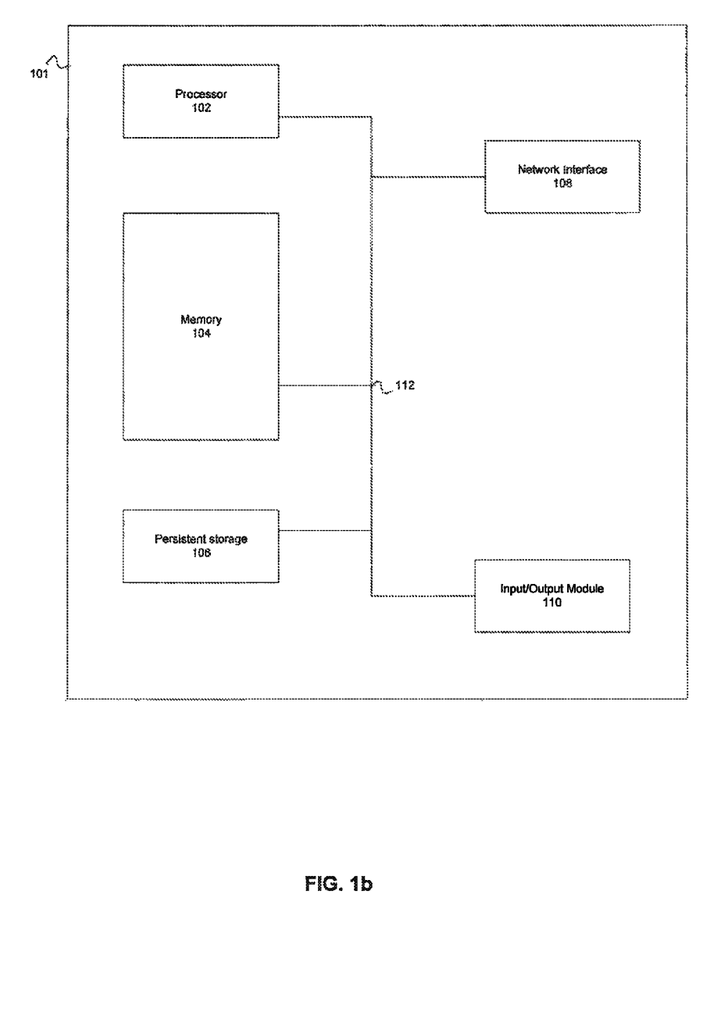
FIG. 1*b* illustrates a computer in which a system to detect placeholder images can be implemented in accordance with an embodiment.

FIG. 1b is a block diagram of a computer 101 that can be used to implement system 100 to detect placeholder images. According to an embodiment, computer 101 comprises at least one processor 102, a memory 104, a storage 106, a network interface 108, a user input/output device 110, and communication infrastructure 112. Processor 102 comprises one or more processors that are configured to execute applications such as placeholder image detector 130. Memory 104 can comprise a single memory or multiple interconnected memories located in one or more computers. In an embodiment, memory 104 comprises dynamic random access memory (DRAM). Storage 106 comprises one or more interconnected non-volatile computer readable medium, and may include hard disks, flash memory, optical storage device, and the like. Network interface 108 includes an interface to any type of network, such as, but not limited to, Ethernet and wireless local area network (LAN), to which computer 101 may be connected. User input/output device 110 comprises interfaces to one or more of keyboard, mouse, and display device through which a user, such as a human operator or an application, can control the operations of computer 101 and/or display output from computer 101. Communication infrastructure 112 may include one or more communication buses such as, but not limited to, a system bus, Peripheral Component Interconnect (PCI) bus, Universal Serial Bus (USB), Firewire, or Ethernet. Communication infrastructure 112 provides the interconnection to communicatively couple components of computer 101.

Figure 2:
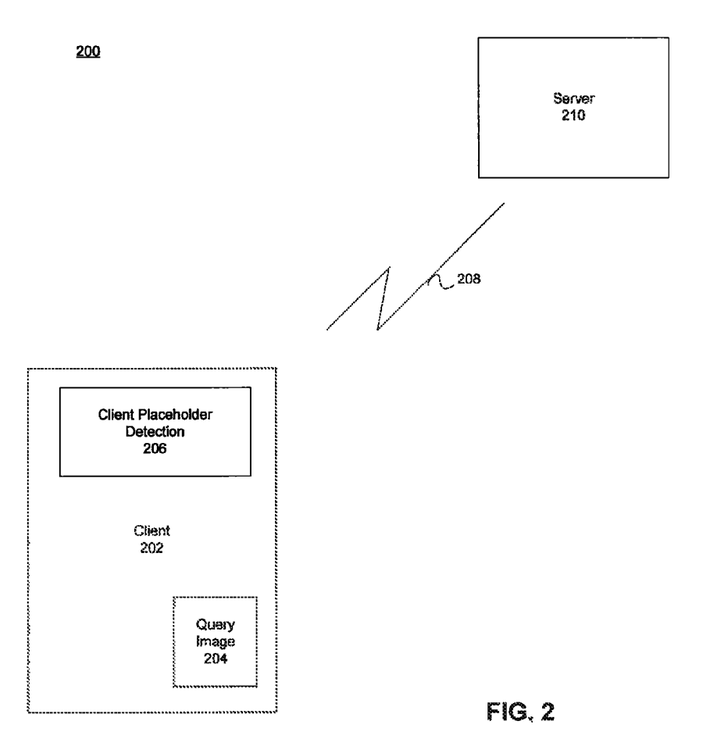
FIG. 2 illustrates a block diagram of a client server system in accordance with an embodiment.

FIG. 2 illustrates a client/server system 200 for detecting placeholder images. Server 210 is a server that has access to a database (not shown) of placeholder images. According to an embodiment, for example, server 210 can include computer 100. Client 202 is communicatively coupled to server 210 through network 208. Network 208 can be based upon any network technology.

Client 202 includes logic to determine whether a newly received image 204 is a placeholder image, by, for example, querying a remote database such as database 114 of system 100. A module 206 may perform placeholder image detection at the client device, using a local or remote database. According to an embodiment, upon being presented with a new image 204 to be determined whether it is a placeholder image, client placeholder image detection module 206 can query a placeholder image detection system and/or database of placeholder images located in server 210. Server 210, upon receiving a client query, may implement a method such as that described below in relation to FIG. 3 or may access a database of placeholder images, in order to respond to the received query.

Figure 3:
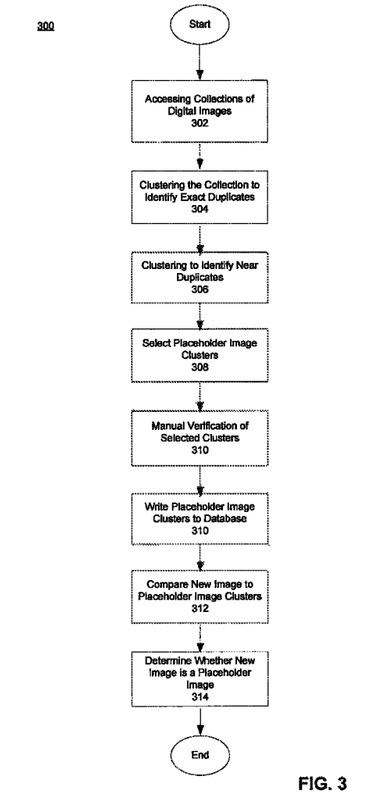
FIG. 3 illustrates a flowchart of a method for detecting placeholder images in accordance with an embodiment.

FIG. 3 illustrates a method 300 of placeholder image detection, according to an embodiment. Method 300 can be implemented, for example, in system 100 or server 210. In step 302, a collection of digital images is accessed from which to detect placeholder images. According to an embodiment, the collection of digital images can be one or more databases, stored either locally or remotely, consisting of images that have been previously gathered. Images may have been gathered from various websites that are accessible through the Internet. For example, the images stored in the collection database may include all images from various shopping websites by a web-crawler. According to another embodiment, the collection of images may be an index that stores a pointer to the actual image stored elsewhere, and stores information such as an image signature or other information useful in compare and clustering operations locally. The collection of digital images can also include metadata associated with the respective images. For example, for each image, the URL information, click-through rate, number of linking sources, and the like, can be stored as metadata. Information such as the click-through rate and the number of linking sources may be obtained from the websites themselves from which the respective images were obtained, or from a separate web tracking or web analysis software.

In step 304, the collection of images is clustered to generate a plurality of clusters of images that are exact-duplicates. Exact-duplicate images, as the term is used herein, are images that are pixel-for-pixel the same. In general, detecting exact-duplicates is relatively more efficient than the detection of near-duplicates. In step 304, any method for exact-duplicate image detection can be used. According to an embodiment, the MD5 hash value for each of the images is calculated, and the images are clustered based upon the MD5 scores. The clustering of exact-duplicates may significantly reduce the number of images that have to be considered in the next clustering stage which is, in general, more compute-intensive. For example, it is frequently the case that shopping sites have the same stock image that is displayed for every item for which an image is unavailable.

In step 306, the collection of images is clustered to generate a plurality of clusters of images that contain near-duplicates. Near-duplicate images, as the term is used herein, refer to images that are not pixel-to-pixel identical but differ with respect to one or more of the size of the image, the format, or color while the scene of the image remains the same. One or more known methods of near-duplicate image detection can be used in step 306 to identify clusters of near-duplicates.

As disclosed herein, placeholder image detection does not require that the detection method consider adversarial modifications to images, such as, for example, modifications made in spam or forgery situations. For example, a shopping website may include either the exact-duplicate images (which are of the same size) or scaled-versions of those images as placeholders. Using this observation, in embodiments, a "near-duplicate" image may be defined to include two images that differ only in image size, color, format, or the like. Images that differ with respect to the scene or subject matter of the images are neither exact-duplicates nor near-duplicates.

Example methods that can be used in step 306 to characterize images include wavelet-based fingerprints and feature vectors based on features such as Scale Invariant Feature Transform (SIFT) features. Image features can include, but are not limited to, one or more of edges, corners, ridges, interest points, and color histograms. Feature extraction may be based on one or more known methods such as, but not limited to, SIFT and Principal Component Analysis (PCA). According to an embodiment, wavelet-based fingerprints are used to characterize the images using wavelet coefficients, and images are compared based upon the most significant coefficients to identify near-duplicates.

Clustering for near-duplicate images may be performed in one or more stages. Performing multiple stages of clustering can, for example, enable a high level of granularity in discovering near-duplicate images. According to an embodiment, connected component analysis is performed followed by leader clustering. Step 306 is discussed in further detail in relation to FIG. 4 below.

Not all of the clusters of exact-duplicate images identified at step 304 are placeholder image clusters. Nor are all of the near-duplicate image clusters identified at step 306 placeholder image clusters. Accordingly, in step 308, one or more clusters from the exact-duplicate clusters and the near-duplicate clusters are determined to be placeholder image clusters. The determination may be made based upon one or more predetermined selection criteria. According to embodiments, clusters of placeholder images may be required to be greater than a threshold size, or may be required to have distances less than a predetermined threshold between respective pairs of images in the cluster. According to another embodiment, the cluster may be required to have click-through rate measure that is below a predetermined threshold. A click-through rate measure for a cluster may be, for example, a minimum click-through rate of respective images in the cluster, or an average click-through rate of images in the cluster. According to yet another embodiment, images in a cluster may be required to have a greater than a minimum threshold of sources that are linking to the images. In yet other embodiments, lexical analysis of URL information for the images in a cluster may be performed in order to determine the likelihood of a cluster being a cluster of placeholder images. The determination of placeholder image clusters is further described in relation to FIG. 5 below.

In step 310, optionally, a human evaluator may verify that the one or more clusters selected in 308 are clusters of placeholder images, and may prune any non-placeholder image clusters from the selected clusters. It should be noted that the preceding steps 302-308 typically result in a relatively small number of clusters that are presented (optionally) to a human evaluator for review. By allowing the human evaluator to focus only on the largest of the clusters, the manual operation is made more efficient. Alternatively, the exact-duplicate clusters and near-duplicate clusters that are borderline placeholder image clusters or borderline non-placeholder image clusters can be presented to the human evaluator, so as to ensure proper evaluation of clusters near the threshold of the selection criteria.

In step 312, according to an embodiment, the selected placeholder image clusters or the selected and verified placeholder image clusters are stored to a database. For example, the placeholder image clusters can be written to a database 114.

Steps 314-316 can be performed, according to an embodiment, to determine if a new image is a placeholder image. In step 314, a new image is compared to one or more of the clusters identified as placeholder image clusters. The comparison can be based upon comparing the similarity of the new image to each of the images in the placeholder image clusters. The new image may be associated with, for example, an average or median similarity score for each of the placeholder image clusters, based upon the comparison. In step 316, it is determined whether the new image is a placeholder image. According to an embodiment, if the new image is assigned a similarity score above a configured threshold similarity score, the new image can be determined as a placeholder image.

Figure 4:
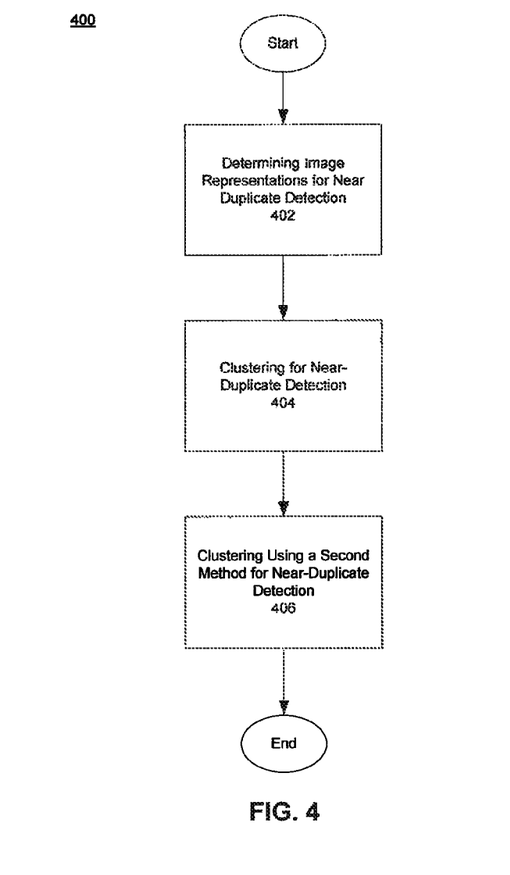
FIG. 4 illustrates a flowchart of a method of performing near-duplicate image clustering for the detection of placeholder images.

FIG. 4 illustrates a method 400 for performing the near-duplicate image clustering, according to an embodiment. For example, method 400 may be used in performing step 306 of method 300.

In step 402, the image is represented in a manner suitable for near-duplicate image detection. One of many conventional methods of image representation can be used to represent the images in a manner suited for near-duplicate detection. Exemplary representations include a bag-of-visual words representation where an image is represented by a vector in which each element denotes the number of features in the image that are represented by given visual word. The set of visual words may be predetermined or may be dynamically determined from the input image data set. According to an embodiment, the images are represented as a feature vector of wavelet transforms. For example, the image pixels may be represented in the wavelet domain by transforming each pixel to a value in a wavelet domain such as the conventional Haar wavelet domain. Thereafter the image can be represented as a feature vector of a predetermined number of the largest coefficients.

In step 404, the images in a collection of images are clustered using a first method of near-duplicate image clustering. One of many clustering methods can be used to determine near-duplicate image clusters. According to an embodiment, a conventional connected component analysis algorithm is used to perform the initial near-duplicate image clusters. For example, images can be represented as nodes of a graph and edges represent the distance between the respective image pairs. The graph may be analyzed to identify connected components or subgraphs that include images within a desired distance of each other. For example, the initial set of near-duplicate clusters may be obtained by performing the connected component analysis on the graph which has an edge connecting two images if the Jaccard distance between their wavelet-based fingerprints is less than a threshold.

According to another embodiment, optionally as shown in step 406, a second stage of near-duplicate clustering of the set of initial near-duplicate clusters can be performed using a conventional method such as a leader clustering. Leader clustering can be configured, for example, with a threshold distance according to a local feature-based method using SIFT descriptors. According to another embodiment, leader clustering may be performed using Jaccard distance between wavelet fingerprints of the respective images. The leader clustering may result in a set of clusters in which each cluster has images that are within a configured threshold distance (corresponding to a high match) from a cluster center. The threshold can be configured to a sufficiently low value so that images within clusters may have only limited differences such as a change in size of the image etc.

Figure 5:
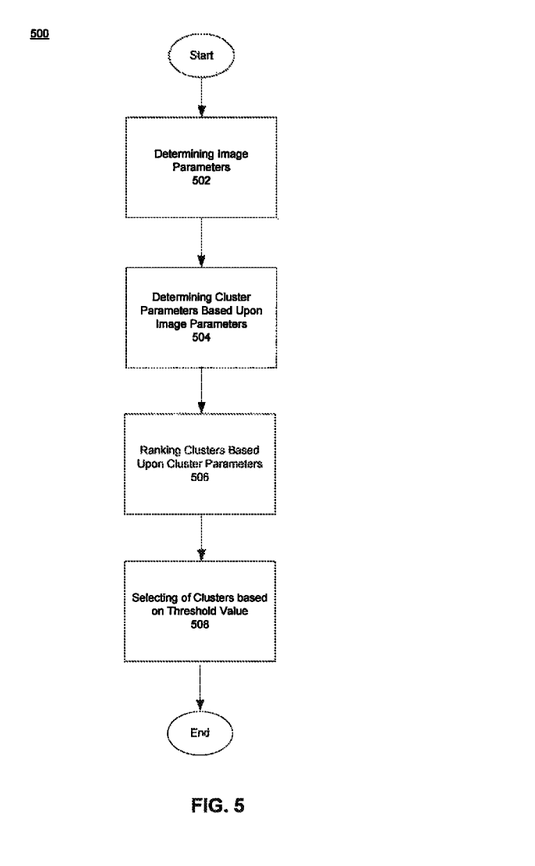
FIG. 5 illustrates a flowchart of a method selecting clusters of placeholder images in accordance with an embodiment.

FIG. 5 illustrates a method 500 for the selection of placeholder image clusters from the set of exact-duplicate clusters and near-duplicate clusters, according to an embodiment. For example, method 500 may be used in performing step 308 in method 300.

In step 502, image metadata is accessed. According to an embodiment, metadata associated with an image includes one or more of information associated with the image, click-through rates associated with the image, the number of sources linking to the image. The metadata may be stored in a collection of images, or may be acquired separately. Another metric to be evaluated for an image may be whether the image includes recognizable characters. For example, a numeric score for the presence of characters in the image can be configured to be higher if a term from a predefined set of terms indicative of placeholder images is found in the image.

In step 504, cluster parameters are determined. According to an embodiment, the cluster parameters can include one or more of the size of the cluster, the average inter-distance between images in the cluster, a statistical measure of the click-through rates associated with the images in the cluster, and a statistical measure of the number of sources linking to the respective images in the cluster.

In step 506, the clusters are ranked according to a metric. According to an embodiment, the clusters may be ranked based on one or more of the cluster parameters evaluated for each cluster in step 504. According to another embodiment, the clusters are ranked based upon a weighted sum of two or more of the metrics evaluated in step 504. A ranking metric may be created as a weighted sum of the size of the cluster, average inter-distance among images, and click-through rates.

In step 508, one or more clusters are selected based upon the ranked list of clusters. According to an embodiment, for each ranking metric that is used in step 506, a number (e.g., the five highest ranked) of clusters may be considered as placeholder image clusters. The number of clusters to be considered may be experimentally determined for each ranking metric. In other embodiments, selecting from the ranked lists may be based upon criteria, such as, but not limited to, selecting clusters ranked within a percentile, or selecting the highest consecutively ranked clusters based upon comparing distances between respective pairs of consecutively ranked clusters.

Figure 6:
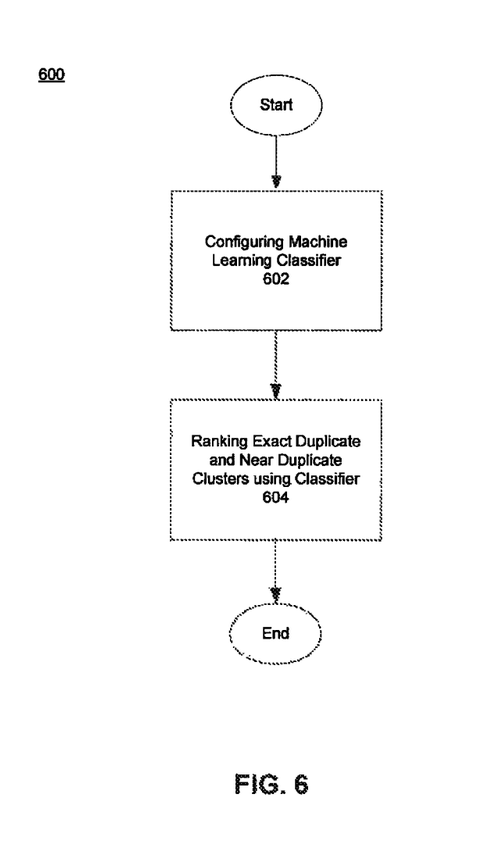
FIG. 6 illustrates a flowchart of another method of selecting clusters of placeholder images in accordance with an embodiment.

FIG. 6 illustrates a method 600 for selecting placeholder image clusters from the set of exact-duplicate clusters and the set of near-duplicate clusters. In step 602, a machine-learning classifier is configured to classify the exact-duplicate or near-duplicate clusters to select the set of placeholder image clusters. The classifier may be a support vector machine (SVM) classifier, a linear classifier, or other such classifier. The classifier may be trained on one or more signals suitable for the detection of placeholder images. Exemplary signals used for the classifier include appearance of image, text in the image, relative size of the cluster, number of images that come from the same source (e.g., same website). An exemplary classifier may assign a score to each of the clusters, the score being based upon a weighted sum of several signals.

In step 604, the classifier is used to rank the exact-duplicate and near-duplicate clusters according to their likelihood of being placeholder image clusters. The classifier can be executed linearly or in parallel to classify the clusters. The classifier, by assigning to each cluster a score based on an evaluation of the selected signals in each cluster, ranks the set of clusters. The ranked set of clusters can subsequently be used to select the placeholder image clusters.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present disclosure should not be limited by any of the above-described exemplary embodiments, but should be defined only in accordance with the following claims and their equivalents.

What is claimed is:

1. A method of detecting placeholder images, comprising:
   accessing, using at least one processor, a collection of digital images;

clustering, using the at least one processor, the digital images to generate at least one of a plurality of exact-duplicate image clusters or a plurality of near-duplicate image clusters;

determining for respective clusters of the near-duplicate image clusters a linking sources measure based upon a number of linking sources of images contained in the respective near-duplicate image cluster; and identifying, using the at least one processor, one or more placeholder image clusters from the at least one of the plurality of exact-duplicate image clusters or the plurality of near-duplicate image clusters, including identifying one or more clusters of the near-duplicate image clusters that have a linking sources measure above a threshold value as placeholder image clusters.

2. The method of claim 1, further comprising:
writing the selected one or more placeholder image clusters to a placeholder image database.

3. The method of claim 2, further comprising:
comparing a second image to the one or more placeholder image clusters; and
determining if the second image is a placeholder image based upon the comparison.

4. The method of claim 1, wherein the clustering step comprises:
calculating an image signature for respective ones of said digital images; and
grouping matching ones of the digital images based upon the respective image signatures.

5. The method of claim 1, wherein the clustering step comprises:
calculating a feature representation for respective ones of said digital images; and
grouping respective ones of the digital images into a set of clusters using a distance between images, wherein the distance is determined based upon the feature representations of the respective images.

6. The method of claim 1, wherein the identifying one or more placeholder image clusters comprises:
determining a click-through rate for respective images in the near-duplicate image clusters;
determining for respective ones of the near-duplicate image clusters a click-through rate measure based upon the click-through rates of images contained in the respective near-duplicate image cluster;
ranking the near-duplicate image clusters based upon the respective click-through rate measures; and
identifying ones of the near-duplicate image clusters that have a click-through rate measure below a threshold value as placeholder image clusters.

7. The method of claim 1, wherein the identifying one or more placeholder image clusters comprises:
determining for respective images in each of said near-duplicate image clusters a number of linking sources to the image; and
ranking the near-duplicate image clusters based upon the respective linking sources measures.

8. The method of claim 1, wherein the identifying one or more placeholder image clusters comprises:
determining an intra-cluster image variance for respective ones of the near-duplicate image clusters;
ranking the near-duplicate image clusters based upon the respective determined intra-cluster image variances; and
identifying ones of the near-duplicate image clusters for which the determined intra-cluster image variance is below a threshold value as placeholder image clusters.

9. The method of claim 1, wherein the identifying one or more placeholder image clusters comprises:
training a machine-learning classifier to identify placeholder image clusters using two or more signals suitable for detecting placeholder images.

10. The method of claim 9, wherein the two or more signals include one or more of visual characteristics of images contained in at least one of the placeholder image clusters, appearance of text in images contained in at least one placeholder image cluster, and relative size of the at least one placeholder image cluster.

11. The method of claim 9, wherein the two or more signals include at least one of number of unique sources linking to the respective images, and a click-though rate for the respective images.

12. A system for detecting placeholder images, comprising:
a processor;
a memory coupled to the processor;
a collection of digital images configured to be accessible by a program implemented on the processor; and
a placeholder image detection module configured to be executed on the processor, including:
an exact-duplicate clustering module configured to cluster images from the collection of digital images into exact-duplicate image clusters;
a near-duplicate image clustering module configured to:
cluster images from the collection of digital images into near-duplicate image clusters,
determine for respective clusters of the near-duplicate image clusters a linking sources measure based upon a number of linking sources of images contained the respective near-duplicate image cluster; and
placeholder image cluster selection module configured to:
identify one or more placeholder image clusters from at least one of the exact-duplicate image clusters or the near-duplicate image clusters, and
identify one or more clusters of the near-duplicate image clusters that have a linking sources measure above a threshold value as placeholder image clusters.

13. The system of claim 12, wherein the near-duplicate image clustering module is further configured to:
calculate a feature representation for respective ones of said digital images; and
group respective ones of the digital images into a set of clusters using a distance between images wherein the distance is determined based upon the feature representations of the respective images.

14. The system of claim 12, wherein the placeholder image cluster selection module is further configured to select one or more placeholder image clusters by:
determining a click-through rate for respective images in the near-duplicate image clusters;
determining for respective ones of the near-duplicate image clusters a click-through rate measure based upon the click-through rates of images contained in the cluster;
ranking the near-duplicate image clusters based upon the respective click-through rate measures; and
identifying ones of the near-duplicate image clusters that have a click-through rate measure below a threshold value as placeholder image clusters.

15. The system of claim 12, wherein the placeholder image cluster selection module is further configured to select one or more placeholder image clusters by:

determining for respective images in each of said near-duplicate image clusters a number of linking sources to the image; and ranking the near-duplicate image clusters based upon the respective linking sources measures.

16. The system of claim 12, wherein the placeholder image cluster selection module comprises:

a machine-learning classifier configured to identify placeholder image clusters using two or more signals suitable for detecting predetermined placeholder images.

17. An article of manufacture comprising a non-transitory computer readable medium encoding instructions thereon that in response to execution by a computing device cause the computing device to perform operations comprising:

accessing a collection of digital images;

clustering the digital images to generate at least one of a plurality of exact-duplicate image clusters or a plurality of near-duplicate image clusters;

determining for respective clusters of the near-duplicate image clusters a linking sources measure based upon a number of linking sources of images contained in the respective near-duplicate image cluster; and identifying one or more placeholder image clusters from the at least one of the plurality exact-duplicate image clusters or the plurality of near-duplicate image clusters, including identifying one or more clusters of the near-duplicate image clusters that have a linking sources measure above a threshold value as placeholder image clusters.

18. The article of manufacture of claim 17, wherein the clustering comprises:

calculating an image signature for respective ones of said digital images; and grouping matching ones of the digital images based upon the respective image signatures.

19. The article of manufacture of claim 17, wherein the identifying one or more placeholder image clusters comprises:

determining a click-through rate for respective images in the near-duplicate image clusters;

determining for respective ones of the near-duplicate image clusters a click-through rate measure based upon the click-through rates of images contained in the cluster;

ranking the near-duplicate image clusters based upon the respective click-through rate measures; and identifying ones of the near-duplicate image clusters that have a click-through rate measure below a threshold value as placeholder image clusters.

20. The article of manufacture of claim 17, wherein the identifying one or more placeholder image clusters comprises:

determining an intra-cluster image variance for respective ones of the near-duplicate image clusters;

ranking the near-duplicate image clusters based upon the respective determined intra-cluster image variances; and identifying ones of the near-duplicate image clusters for which the determined intra-cluster image variance is below a threshold value as placeholder image clusters.

21. The article of manufacture of claim 17, wherein the identifying one or more placeholder image clusters comprises:

configuring a machine-learning classifier to identify placeholder image clusters using two or more signals suitable for detecting placeholder images.

* * * * *

UNITED STATES PATENT AND TRADEMARK OFFICE
CERTIFICATE OF CORRECTION

PATENT NO. : 8,582,872 B1
APPLICATION NO. : 13/173898
DATED : November 12, 2013
INVENTOR(S) : Ioffe et al.

Page 1 of 1

It is certified that error appears in the above-identified patent and that said Letters Patent is hereby corrected as shown below:

In the Claims

Column 12, Line 13, Claim 11
Please replace "at least one of number" with --at least one of a number--.

Column 12, Line 33, Claim 12
Please replace "images contained the" with --images contained in the--.

Column 13, Line 24, Claim 17
Please replace "the plurality exact-duplicate" with --the plurality of exact-duplicate--.

Signed and Sealed this
Eleventh Day of March, 2014

Michelle K. Lee
*Deputy Director of the United States Patent and Trademark Office*